United States Patent
Fujii et al.

(10) Patent No.: US 8,983,498 B2
(45) Date of Patent: Mar. 17, 2015

(54) COMMUNICATION APPARATUS AND METHOD FOR CONTROLLING COMMUNICATION SYSTEM

(71) Applicant: Fujitsu Limited, Kawasaki-shi, Kanagawa (JP)

(72) Inventors: Takahiro Fujii, Kawasaki (JP); Satoru Hirasawa, Kawasaki (JP); Yoshiaki Fukunaga, Yokohama (JP); Takayuki Ohtsuka, Kawasaki (JP); Nobuaki Kitazumi, Sagamihara (JP); Tomohiro Sakai, Kawasaki (JP); Takeshi Masubuchi, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 13/786,282

(22) Filed: Mar. 5, 2013

(65) Prior Publication Data

US 2013/0281098 A1 Oct. 24, 2013

(30) Foreign Application Priority Data

Apr. 18, 2012 (JP) ................................. 2012-094778

(51) Int. Cl.
*H04W 40/04* (2009.01)

(52) U.S. Cl.
CPC ..................................... *H04W 40/04* (2013.01)
USPC ....................................... 455/456.2; 455/445

(58) Field of Classification Search
CPC ......... H04L 69/14; H04L 65/80; H04L 67/14; H04L 67/141; H04M 7/123; H04M 7/066; H04W 80/10
USPC .......................................................... 455/445
See application file for complete search history.

(56) References Cited

U.S. PATENT DOCUMENTS

| | | | |
|---|---|---|---|
| 6,859,435 B1* | 2/2005 | Lee et al. | 370/231 |
| 2010/0046511 A1* | 2/2010 | Khalid et al. | 370/389 |
| 2011/0044332 A1 | 2/2011 | Matsumoto | |
| 2011/0261758 A1 | 10/2011 | Hapsari et al. | |

FOREIGN PATENT DOCUMENTS

| | | |
|---|---|---|
| JP | 2009-302847 A | 12/2009 |
| JP | 2010-087990 A | 4/2010 |
| JP | 2010-232841 A | 10/2010 |
| JP | 2011-044800 A | 3/2011 |

OTHER PUBLICATIONS

L. Ong, et al., "An Introduction to the Stream Control Transmission Protocol (SCTP)", rfc3286, IETF, May 2002.
R. Stewart, et al, "Stream Control Transmission Protocol (SCTP) Specification Errata and Issues", rfc4460, IETF, Apr. 2006.
R.Stewart, Ed., "Stream Control Transmission Protocol", rfc4960, IETF, Sep. 2007.

* cited by examiner

*Primary Examiner* — Kashif Siddiqui
(74) *Attorney, Agent, or Firm* — Arent Fox LLP

(57) ABSTRACT

In a method for controlling a communication system, the reception device reports a first size of a free space of a buffer in the reception device to the transmission device. The transmission device controls transmission of first data with a first priority to the reception device based on the first size. The transmission device controls transmission of second data with a second priority lower than the first priority to the reception device based on a threshold less than the first size.

9 Claims, 17 Drawing Sheets

COMMUNICATION APPARATUS AND METHOD FOR CONTROLLING COMMUNICATION SYSTEM

CROSS-REFERENCE TO RELATED APPLICATION

This application is based upon and claims the benefit of priority of the prior Japanese Patent Application No. 2012-094778, filed on Apr. 18, 2012, the entire contents of which are incorporated herein by reference.

FIELD

The embodiment discussed herein is related to a communication apparatus and a method for controlling a communication system.

BACKGROUND

FIG. 1 depicts an example of a configuration of a radio communication system of LTE (long term evolution).

The radio communication system 100 depicted in FIG. 1 includes, for example, a plurality of radio base stations (eNode B, referred to below as eNB) 300-1 to 300-3 capable of communicating with a radio terminal as an example of UE (user equipment) via a wireless link, and MME (mobility management entity)/SGW (serving gateway) 200-1 and 200-2, which are higher level devices to the eNBs 300-1 to 300-3. When the eNB 300-1 to the eNB 300-3 are not distinguished, they are referred to below as the eNB 300. When the MME/SGW 200-1 and the MME/SGW 200-2 are not distinguished, they are referred to as the MME/SGW 200.

In the above radio communication system 100, communication between the eNB 300 and the MME/SGW 200 is performed via an inter-device interface called the S1 interface. On the other hand, communication between the eNBs 300 is performed via an inter-device interface called the X2 interface.

The S1 interface is used to connect between the eNB 300 and the MME/SGW 200 using the IP (Internet protocol) to transfer a signal of a control plane (C-plane) and/or a user plane (U-plane). On the other hand, the X2 interface is used to connect between the eNB 300-1, eNB 300-2, and eNB 300-3 using the IP to transfer a signal of a control plane and/or a user plane.

One communication protocol used when a control signal is transferred in the S1 interface, X2 interface, or the like is SCTP (Stream Control Transmission Protocol).

SCTP is a transport layer communication protocol that avoids duplicate transmission, loss, or the like of a packet as much as possible and enables reliable information transfer by validating a packet on the basis of a sequence number and checksum over the IP.

A network entity (also referred to below as a node) with the SCTP function has one or more of logical terminal points called endpoints and establishes a logical connection (SCTP link), which is called an association, with an endpoint of another node. At this time, a node (endpoint) is in one of two states: a client and server. A node in the state of a client is requested to operate as a transmission side of a request for establishing a connection (association) and a node in the state of a server is requested to operate as a reception side of the request.

A packet in SCTP includes an SCTP common header and one or more of data blocks called chunks that follow the SCTP common header. There are two types of chunks: a control chunk in which a control signal (message) is stored and a data chunk in which user data is stored. A control chunk is transmitted when, for example, an association is established (initialization: INIT) or released.

For example, when an association is established, an INIT chunk, INIT-ACK chunk, COOKIE-ECHO chunk, COOKIE-ACK chunk, or the like is used as a control chunk. On the other hand, when an association is released, a SHUTDOWN chunk, SHUTDOWN-ACK chunk, SHUTDOWN-COMPLETE chunk, or the like is used as a control chunk.

Next, an example of a protocol stack of the control plane of the S1 interface in LTE is depicted in FIG. 2 and an example of a protocol stack of the control plane of the X2 interface in LTE is depicted in FIG. 3.

As depicted in FIG. 2, in the S1 interface, the physical (PHY) layer, data link (MAC: media access control) layer, IP layer, SCTP layer, and S1-AP (application) layer are defined, in order from the lowest layer, as the protocol stack of the control plane. On the other hand, as depicted in FIG. 3, in the X2 interface, the physical (PHY) layer, data link (MAC) layer, IP layer, SCTP layer, and X2-AP (application) layer are defined, in order from the lowest layer, as the protocol stack of the control plane.

In Internet networks, TCP (transmission control protocol) and UDP (user datagram protocol) are often used as a protocol that provides the function of the transport layer (layer 4). These are standard communication protocols used in Internet networks.

UDP supports a connectionless service. Therefore, UDP is not used to transfer a message. On the other hand, TCP supports a connection-oriented service. Therefore, TCP allows reliable data transfer. However, a transfer delay may occur and prioritized transfer is not allowed. Accordingly, it is difficult to use TCP for message transfer.

On the other hand, SCTP is a highly reliable communication protocol capable of performing congestion control. SCTP has, for example, the following characteristics.

(1) SCTP is a message-oriented communication protocol. That is, framing per message is enabled, avoiding missing the structure and order of a datagram.

(2) SCTP avoids duplicate transmission of a packet or the like and ensures reliability by validating a packet on the basis of a sequence number and checksum.

(3) SCTP is a multihoming-enabled communication protocol that allows one stream to have a plurality of communication paths, so SCTP has an outstanding fault recovery function.

In SCTP, a communication connection (association) is established between the transmission side and the reception side of a message to perform communication.

An association is different from a TCP connection in that a plurality of separate communication channels (streams) may be logically supported for one association internally.

All streams (for example, stream #01, stream #02, stream #03, and stream #04) in an association are independent of each other as illustrated in FIG. 4, but these streams are associated with a certain association. Each of the streams is given a stream number (for example, #01 to #04) and each stream number is encoded in an SCTP packet flowing through the association.

In multi-streaming, it is important that a blocked stream does not affect other streams in the association.

A stream is assigned for each user and is used when, for example, data of a call connection processing is transmitted or received.

As a technique related to SCTP, a method has been proposed in that a message with an urgency higher than urgencies of other communications is preferentially processed in a layer in which streams are controlled.

Another method has also been proposed in that data in communication between stations is transmitted depending on the priority.

Japanese Laid-open Patent Publication No. 2010-087990 and Japanese Laid-open Patent Publication No. 2011-044800 disclose related techniques.

The following non-patent documents also disclose related techniques: L. Ong et al., "An Introduction to the Stream Control Transmission Protocol (SCTP)", online, Internet (URL: https://www.ietf.org/rfc/rfc3286.txt), May 2002 (searched on Feb. 21, 2012), R. Stewart et al., "Stream Control Transmission Protocol (SCTP) Specification Errata and Issues", online, Internet (URL: https://www.ietf.org/rfc/rfc4460.txt), April 2006 (searched on Feb. 21, 2012), and R. Stewart, Ed., "Stream Control Transmission Protocol", online, Internet (URL: https://www.ietf.org/rfc/rfc4960.txt), September 2007 (searched on Feb. 21, 2012).

Recently, with the spread of radio terminals such as mobile phones, the number of emergency telephone calls to emergency contact departments such as the police, ambulance, and fire departments from radio terminals is increasing year by year.

According to a research by the Tokyo Metropolitan Police Department, the number of emergency telephone calls to the police received from January to November 2010 in Japan is 8,491,285, which is greater than in the same period in 2009 by 236,958 (2.3%).

Of 8,491,285 emergency calls above, the number of calls from radio terminals is 5,593,241, which is more than half of the total.

In the case of, for example, a disaster or the like, radio base stations may be congested by general calls having a relatively low priority. Since communication that depends on the priority is not defined for communication using SCTP, a delay may occur in processing of emergency calls having a relatively high priority.

SUMMARY

According to an aspect of the present invention, provided is a method for controlling a communication system. The communication system includes a transmission device and a reception device. In the method, the reception device reports a first size of a free space of a buffer in the reception device to the transmission device. The transmission device controls transmission of first data with a first priority to the reception device based on the first size. The transmission device controls transmission of second data with a second priority lower than the first priority to the reception device based on a threshold less than the first size.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment will be described below with reference to the drawings. The embodiment described below is only an example and various modifications and application of techniques that are not indicated clearly by the embodiment are not excluded. That is, the embodiment may be modified if there is no departure from the main spirit of the embodiment.

Embodiment

Example of Occurrence of Delay in an Emergency Call

Figure 1:
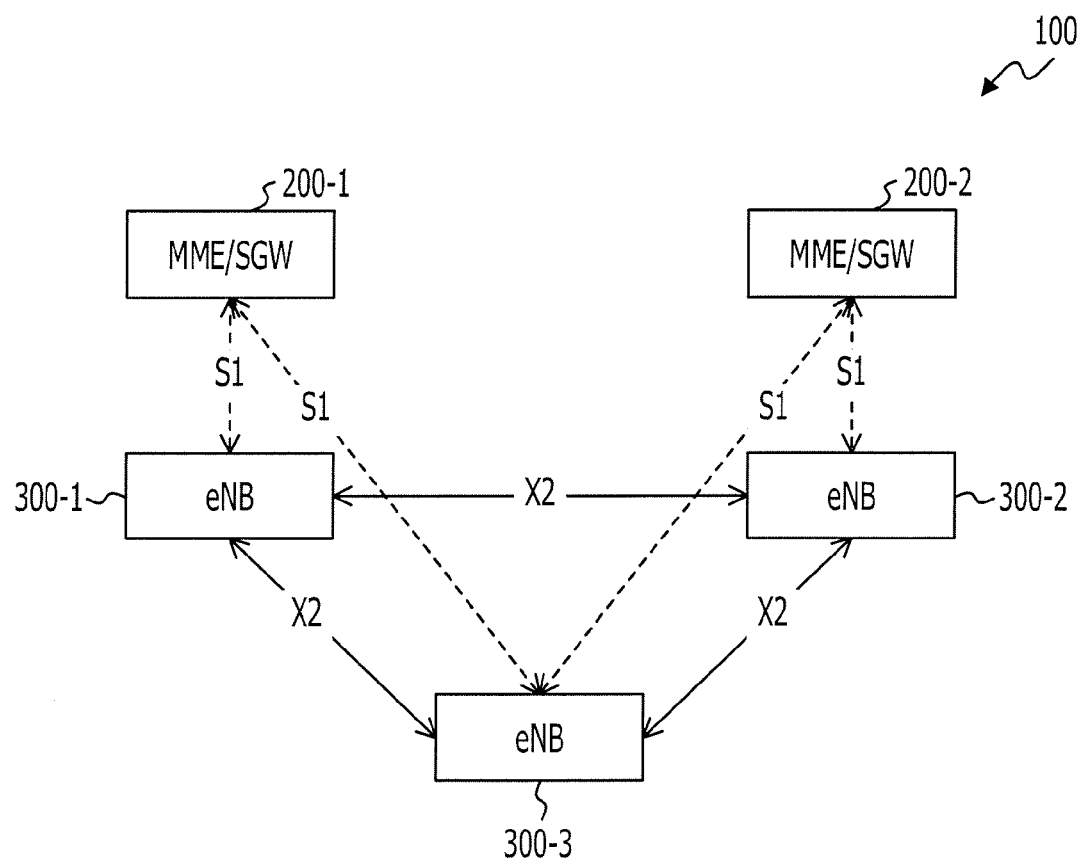
FIG. 1 depicts an example of a configuration of a radio communication system of LTE.
Figure 2:
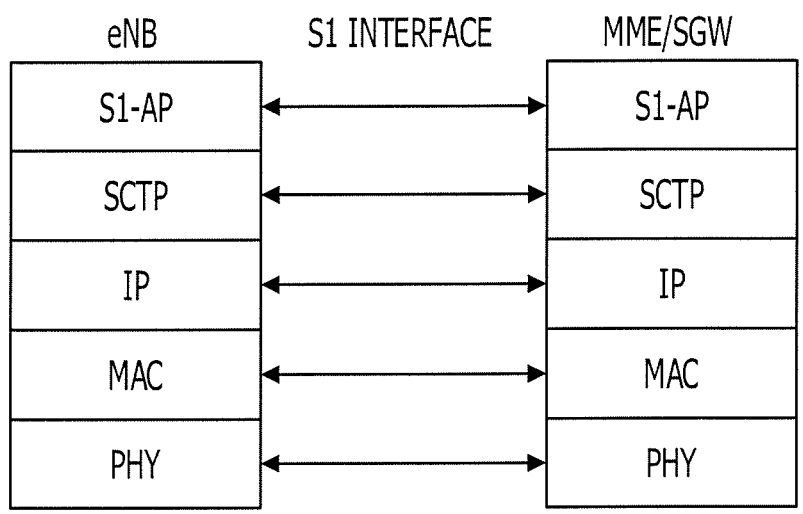
FIG. 2 depicts an example of a protocol stack of a control plane of the S1 interface.
Figure 3:
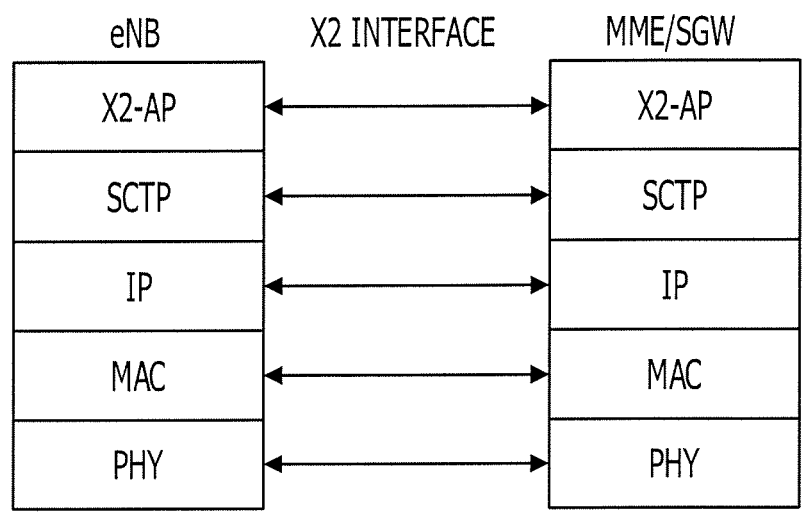
FIG. 3 depicts an example of a protocol stack of a control plane of the X2 interface.
Figure 4:
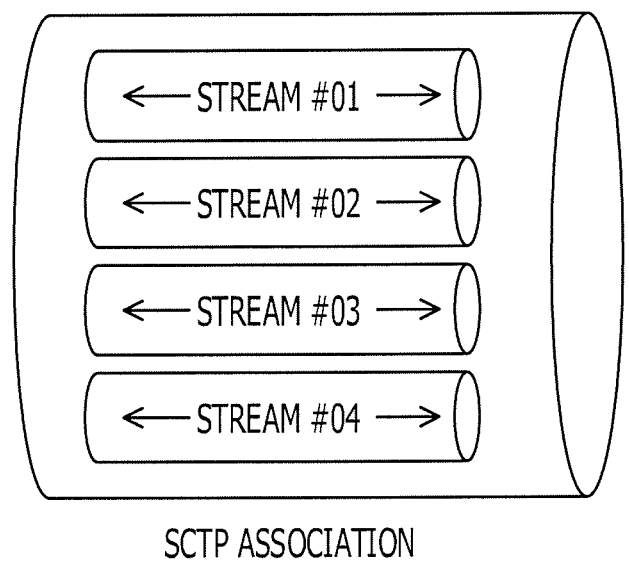
FIG. 4 depicts an example of an SCTP association.
Figure 5:
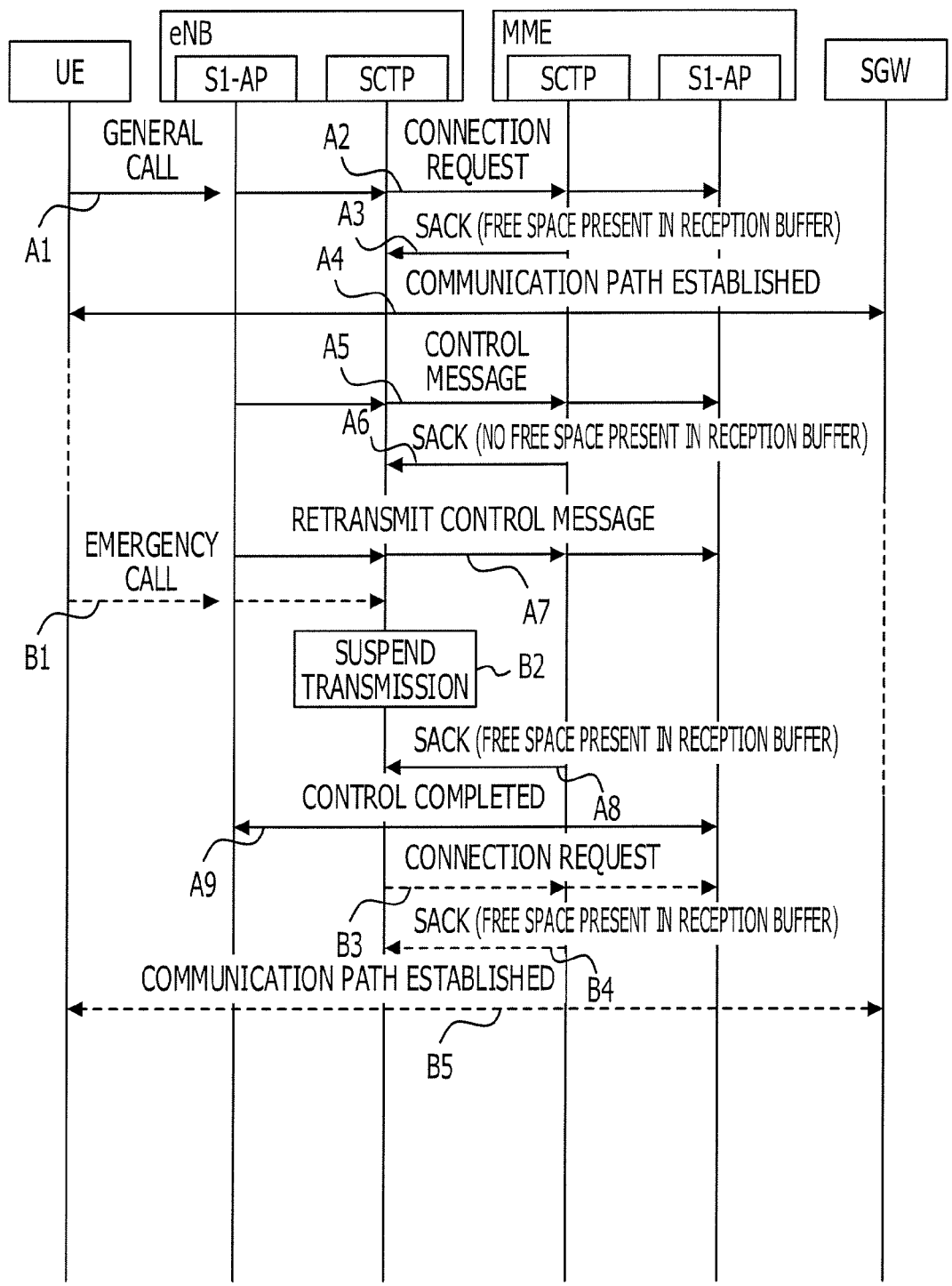
FIG. 5 depicts an example of a case where an emergency call delays.

FIG. 5 depicts an example of a delay in an emergency call. It is assumed that, for example, an SCTP association (communication link) is established between an eNB and an MME that perform call processing control, a plurality of streams (for example, stream #01, stream #02, stream #03, and stream #04 as illustrated in FIG. 4) are set, and one (for example, stream #01) of the plurality of streams that were set is used for setting control of an emergency call with a priority higher than a priority of a general call.

In this case, when a request for setting a general call is transmitted from a UE to the eNB as illustrated in FIG. 5 (A1), the S1-AP layer and the SCTP layer of the eNB transmit a connection request to the S1-AP layer and the SCTP layer of the MME (A2).

At this time, when there is a free space in a reception buffer in the MME, which is an example of an opposing node of the eNB, the MME returns a SACK (selective acknowledgement) response indicating that a free space is present in the reception buffer to the eNB (A3).

This establishes a communication path (at least one of streams #02 to #04) for a general call between the UE and an SGW (A4).

At this time, if control (changing the communication type, performing hand over, or the like) for the established general call occurs, the S1-AP layer and the SCTP layer of the eNB transmit a control message to the S1-AP layer and the SCTP layer of the MME (A5).

In some cases, there is no free space in the reception buffer in the MME. In such a case, the MME returns a SACK response indicating that no free space is present in the reception buffer to the eNB (A6).

Upon receiving the SACK response indicating that no free space is present in the reception buffer from the MME, the eNB detects that the above control has not completed and, after a certain time from the transmission of the above control message, retransmits the control message (A7).

When a request for setting an emergency call with a priority higher than a priority of a general call is transmitted from another UE to the eNB (B1), the SCTP layer of the eNB suspends the transmission of the connection request of the emergency call until a free space is generated in the reception buffer in the MME (B2).

When a free space is generated in the reception buffer in the MME, the SCTP layer of the MME transmits a SACK response indicating that a free space is present in the reception buffer to the SCTP layer of the eNB (A8).

This completes control corresponding to the above control message between the eNB and the MME (A9).

Next, the SCTP layer of the eNB detects, based on the SACK response received in A8, that a free space has been generated in the reception buffer in the MME, and transmits the connection request of the emergency call to the S1-AP layer and the SCTP layer of the MME (B3).

The MME returns a SACK response indicating that a free space is present in the reception buffer to the eNB (B4).

This establishes a communication path (stream #01) for an emergency call between the UE and an SGW (B5). Here, the SGW in B5 is not necessarily the same as the SGW in A4.

As described above, when the reception buffer in the MME is insufficient, processing of an emergency call may be delayed.

Another Example of Occurrence of Delay in an Emergency Call

Figure 6:
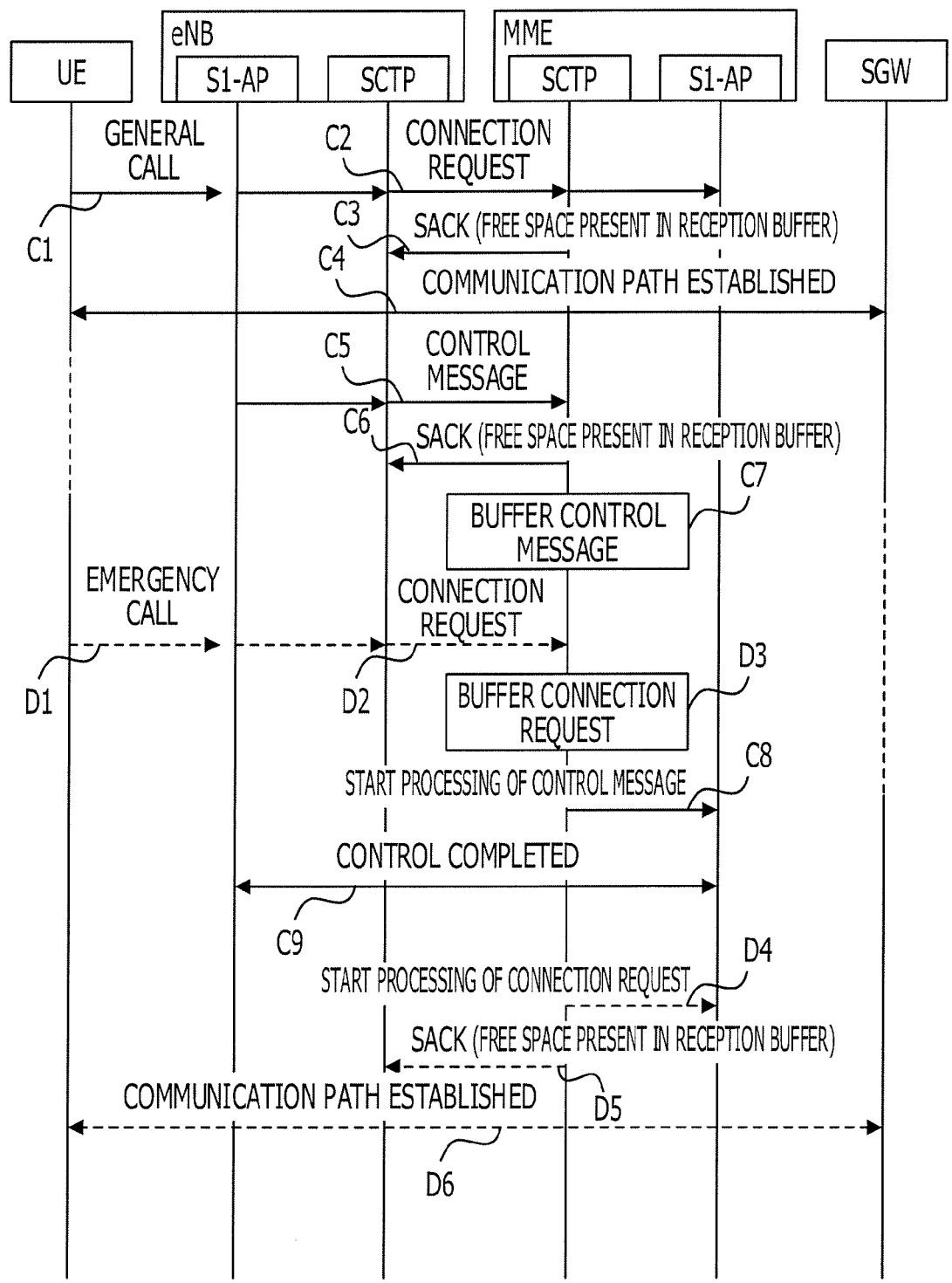
FIG. 6 depicts an example of a case where an emergency call delays.

FIG. 6 depicts another example of a delay in an emergency call. As in the above example, it is assumed that, for example, an SCTP association (communication link) is established between the eNB and the MME that perform call processing control, a plurality of streams (for example, stream #01, stream #02, stream #03, and stream #04 as illustrated in FIG. 4) are set, and one (for example, stream #01) of the plurality of streams that were set is used for setting control of an emergency call with a priority higher than a priority of a general call.

When a request for setting a general call is transmitted from a UE to the eNB as illustrated in FIG. 6 (C1), the S1-AP layer and the SCTP layer of the eNB transmit a connection request to the S1-AP layer and the SCTP layer of the MME (C2).

At this time, when there is a free space in a reception buffer in the MME, which is an example of an opposing node of the eNB, the MME returns a SACK response indicating that a free space is present in the reception buffer to the eNB (C3).

This establishes a communication path (at least one of streams #02 to #04) for a general call between the UE and an SGW (C4).

At this time, if control (changing the communication type, performing hand over, or the like) for the established general call occurs, the S1-AP layer and the SCTP layer of the eNB transmit a control message to the S1-AP layer and the SCTP layer of the MME (C5).

When there is a free space in the reception buffer in the MME, the MME returns a SACK response indicating that a free space is present in the reception buffer to the eNB (C6).

However, when the processing power of the MME is insufficient for data processing, the above control message is buffered (C7) and no control processing is performed.

At this time, if a request for setting an emergency call with a priority higher than a priority of a general call is transmitted from another UE to the eNB (D1), the S1-AP layer and the SCTP layer of the eNB transmit a connection request of the emergency call to the SCTP layer of the MME (D2).

However, when the processing power of the MME is insufficient for data processing, the connection request of an emergency call is buffered as in the above control message (D3) and no connection processing is performed.

When the MME becomes able to process the above control message, the SCTP layer of the MME starts processing the above control message (C8) and the control corresponding to the control message is completed (C9).

Next, when the MME becomes able to process the above connection request of the emergency call, the SCTP layer of the MME starts processing the above connection request (D4) and, when there is a free space in the reception buffer in the MME, the MME returns a SACK response indicating that a free space is present in the reception buffer to the eNB (D5).

This establishes a communication path (stream #01) for the emergency call between the UE and an SGW (D6). Here, the SGW in D6 is not necessarily the same as the SGW in C4.

As described above, when available capacity for data processing in the MME is insufficient, the processing of an emergency call may be delayed.

Accordingly, in this embodiment, a control method described below is proposed with the object of suppressing occurrence of a delay for data with a relatively high priority.

Communication System According to the Embodiment

Figure 7:
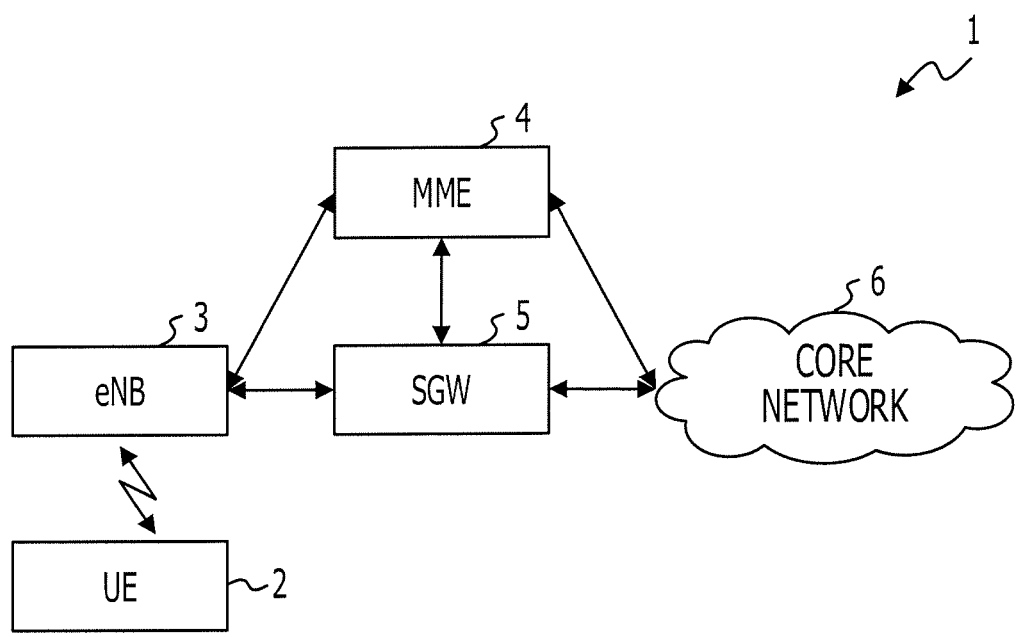
FIG. 7 depicts an example of a configuration of a communication system according to an embodiment.

FIG. 7 depicts an example of a configuration of a communication system 1 according to the embodiment.

As illustrated in FIG. 7, the communication system 1 includes UE 2, an eNB 3, an MME 4, and an SGW 5, and is connected to a core network 6.

The UE 2 is a radio terminal that wirelessly communicates with the eNB 3. The UE 2 is a communication apparatus that, for example, the user is able to move and the UE 2 is therefore synonymous with a radio mobile terminal or a mobile station (MS).

The UE 2 transmits a request for establishing a call to the eNB 3 when wirelessly communicating with the eNB 3. The call is, for example, a general call with a relatively low priority or an emergency call with a priority higher than a priority of a general call.

The eNB 3 provides a communication service area (radio area) including cells, sectors, and the like and wirelessly communicates with a UE 2 located in this communication service area. In addition, the eNB 3 performs wire communication with another eNB 3 via the X2 interface. In addition, the eNB 3 performs wire communication with the MME 4 and the SGW 5 via the S1 interface.

The MME 4 manages the location registration, calling, hand-over, and the like of the UE 2 and the SGW 5 relays user data.

The core network 6 is an external network connected to the communication system 1. The core network 6 has, for example, a PGW (packet data network gateway) and a HSS (home subscriber server). The PGW is a device that is connected to an external network and the HSS is a device that manages user information such as terminal identification numbers.

The eNB 3 in this example communicates with the MME 4, the SGW 5, or another eNB 3 using the SCTP.

That is, the eNB 3 functions as an example of a transmission device that communicates via a communication link established using the SCTP and opposing nodes such as the MME 4 and the SGW 5 function as examples of a reception device that communicates via a communication link established using the SCTP.

Example of Configuration of eNB 3

Figure 8:
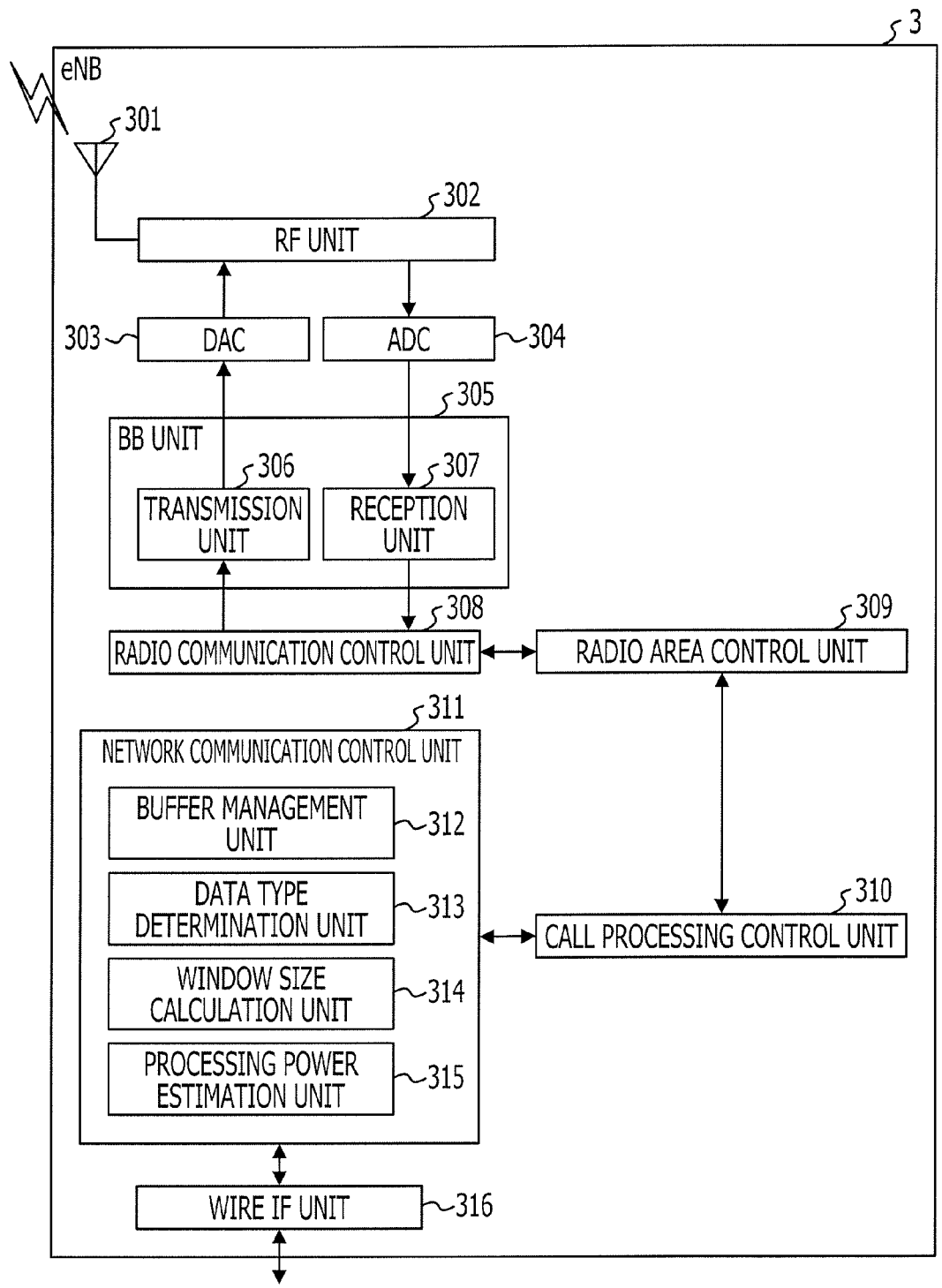
FIG. 8 depicts an example of a configuration of an eNB depicted in FIG. 7.

FIG. 8 depicts an example of a configuration of the eNB 3.

The eNB 3 depicted in FIG. 8 includes, for example, an antenna 301, which transmits and receives a radio signal, and a radio frequency (RF) unit 302, which performs radio reception processing of a radio signal received by the antenna 301 and performs radio transmission processing of a radio signal to be transmitted from the antenna 301.

In addition, the eNB 3 includes, for example, a digital to analog converter (DAC) 303, which converts a digital signal to an analog signal, and an analog to digital converter (ADC) 304, which converts an analog signal to a digital signal.

In addition, the eNB 3 includes, for example, a base band (BB) unit 305 and a radio communication control unit 308. The BB unit 305 includes a transmission unit 306 and a reception unit 307, and performs base band processing. The radio communication control unit 308 controls radio communication.

In addition, the eNB 3 includes, for example, a radio area control unit 309, a call processing control unit 310, a network communication control unit 311, and a wire interface (IF) unit 316. The radio area control unit 309 controls a radio area including cells, sectors, and the like provided by the eNB 3. The call processing control unit 310 controls processing of a call set between the eNB 3 and the UE 2. The network communication control unit 311 controls communication with opposing nodes such as the MME 4 and the SGW 5. The wire IF unit 316 provides a function of interfacing with opposing nodes such as the MME 4 and the SGW 5.

The network communication control unit 311 includes, for example, a buffer management unit 312, a data type determination unit 313, a window size calculation unit 314, and a processing power estimation unit 315.

The buffer management unit 312 manages availability of the reception buffer in opposing nodes such as the MME 4 and the SGW 5 and, based on the result of management, performs data transmission control. The buffer management unit 312 may perform data transmission control on the basis of the result of estimation by the processing power estimation unit 315 described later.

The data type determination unit 313 determines the data type of transmission data. More specifically, the data type determination unit 313 determines, for example, whether transmission data is data related to a general call or data related to an emergency call with a priority higher than a priority of a general call on the basis of information about the type of transmission data specified by the S1-AP layer or X2-AP layer. The result of determination is reported from the data type determination unit 313 to the buffer management unit 312 and this result is used for data transmission control.

The window size calculation unit 314 regularly or irregularly calculates the usage condition or availability of the reception buffer in opposing nodes such as the MME 4 and the SGW 5. More specifically, the window size calculation unit 314 calculates, for example, the usage condition or availability of the reception buffer in the opposing node 4 or 5 on the basis of the Advertised Receiver Window Credit (a_rwnd) reported arbitrarily from opposing nodes such as the MME 4 and SGW 5 and the size of transmission data, and the like. The result of calculation is reported from the window size calculation unit 314 to the buffer management unit 312 and this result is used for data transmission control.

The processing power estimation unit 315 estimates available capacity for data processing in opposing nodes such as the MME 4 and the SGW 5. More specifically, the processing power estimation unit 315 estimates, for example, the available capacity for data processing in the opposing node 4 or 5 on the basis of the transmission data amount, the data transmission interval, and the a_rwnd value reported from the opposing node 4 or 5. The result of estimation is reported from the processing power estimation unit 315 to the buffer management unit 312 and this result is used for data transmission control.

Example of Transmission Control Operation of eNB 3

Figure 9:
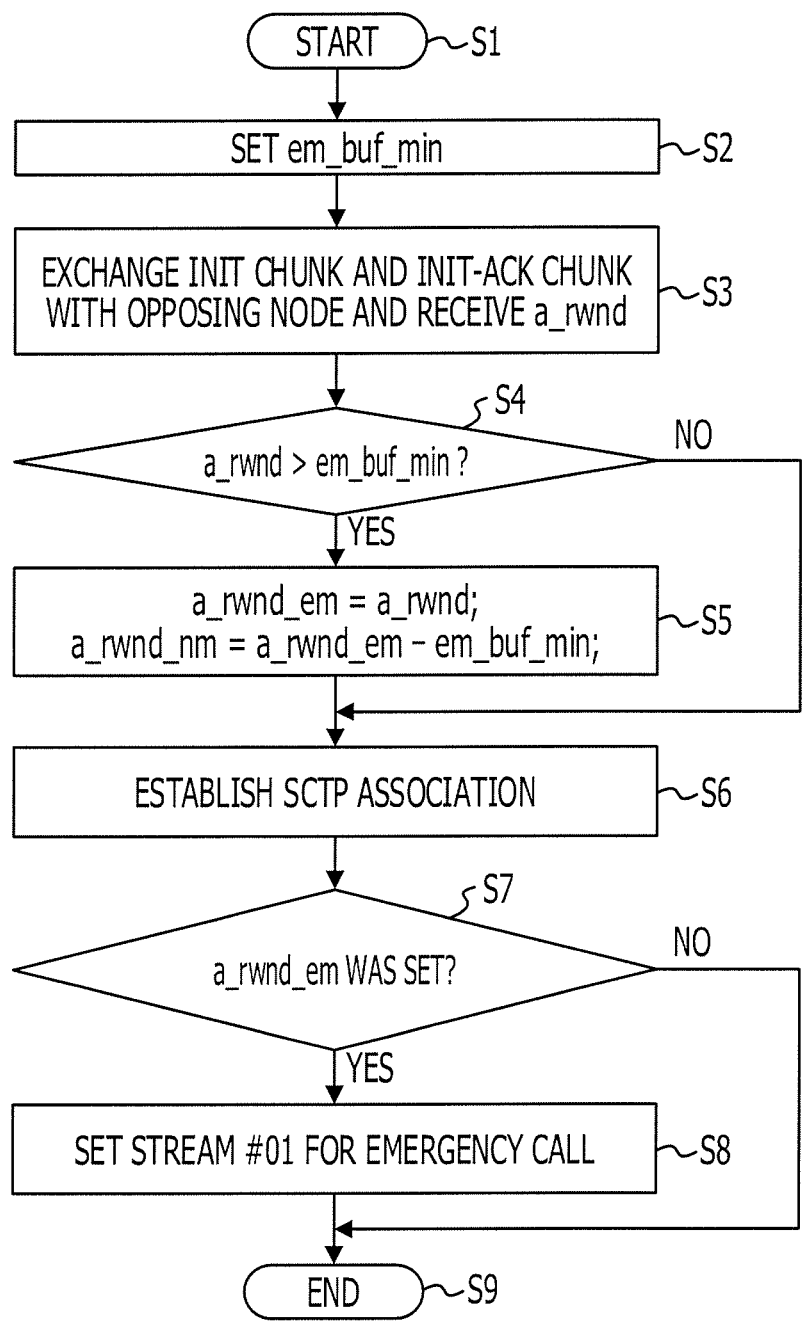
FIG. 9 depicts an example of a control method according to an embodiment.

Next, reservation of a buffer for high priority communication (for an emergency call) will be described as an example of transmission control operation of the eNB 3 with reference to FIG. 9.

When the network communication control unit 311 starts transmission control (S1), the buffer management unit 312 sets a buffer size (minimum guaranteed buffer size: em_buf_min) of the opposing node 4 or 5, which is the minimum buffer size to be ensured for high priority communication such as an emergency call (S2). The em_buf_min value may be determined based on the frequency of occurrence of an emergency call, the number of occurrences of an emergency call, the data size of an emergency call, and the like.

Then, the eNB 3 exchanges (handshakes) control chunks such as an INIT chunk and INIT-ACK chunk with opposing nodes such as the MME 4 and SGW 5 and receives the Advertised Receiver Window Credit (a_rwnd) included in the control chunk from the opposing node 4 or 5 via the antenna 301 via the antenna 301 (S3). The a_rwnd is an SCTP variable in which the transmission side of data stores the size of the reception window obtained by the opposing node 4 or 5 in the latest calculation. The transmission side may grasp the usage condition (availability) of the reception buffer in the opposing node 4 or 5 on the basis of the a_rwnd value. The a_rwnd value may be included in an SACK from opposing node 4 or 5. In addition, since the SCTP defines that the reception side has to receive at least 1500 bytes for one SCTP packet, the a_rwnd value is equal to or more than 1500 bytes.

Next, the buffer management unit 312 compares em_buf_min set in S2 with a_rwnd received in S3 and determines whether a_rwnd is more than em_buf_min (S4).

When the buffer management unit 312 determines that a_rwnd is equal to or less than em_buf_min (No in S4), the buffer management unit 312 does not reserve a buffer for high priority communication because the size of the reception buffer in the opposing node 4 or 5 is insufficient for buffering the high priority data such as an emergency call.

On the other hand, when the buffer management unit 312 determines that a_rwnd is more than em_buf_min (Yes in S4), the buffer management unit 312 reserves a buffer for high priority communication because the size of the reception buffer in the opposing node 4 or 5 is sufficient for buffering the high priority data such as an emergency call. More specifically, the buffer management unit 312 adopts, for example, the a_rwnd value received in S3 as the size (a_rwnd_em) of a buffer for high priority communication (for an emergency call) and adopts the value obtained by subtracting em_buf_min from a_rwnd_em, as the size (a_rwnd_nm) of a buffer for low priority communication (for general call) (S5).

Figure 10:
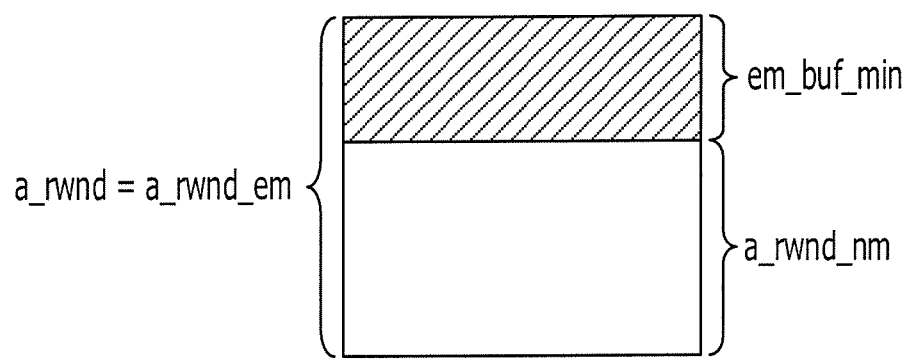
FIG. 10 depicts relationship among a_rwnd, a_rwnd_em, a_rwnd_nm, and em_buf_min.

That is, the relationship between the size (a_rwnd) of the current reception window, the size (a_rwnd_em) of a buffer for high priority communication (for an emergency call), the size (a_rwnd_nm) of a buffer for low priority communication (for a general call), and the minimum guaranteed buffer size (em_buf_min) in the opposing node 4 or 5 is depicted in FIG. 10.

Returning to FIG. 9 again, the eNB 3 establishes an SCTP association with the opposing node 4 or 5 (S6) and determines whether the size (a_rwnd_em) of a buffer for high priority communication (for an emergency call) was set (S7).

When the eNB 3 determines that the size (a_rwnd_em) of a buffer for high priority communication (for an emergency call) was not set, that is, the processing proceeded to No in S4 (No in S7), the eNB 3 ends the processing without reserving a buffer for an emergency call (S9). In this case, the eNB 3 may perform, for example, SCTP transmission control without priority.

On the other hand, the eNB 3 determines that the size (a_rwnd_em) of a buffer for high priority communication (for an emergency call) was set, that is, the processing proceeded to Yes in S4) (Yes in S7), the eNB 3 sets any one stream (for example, stream #01) in the SCTP association as a stream for communication for an emergency call (S8) and end the processing (S9).

Figure 11:
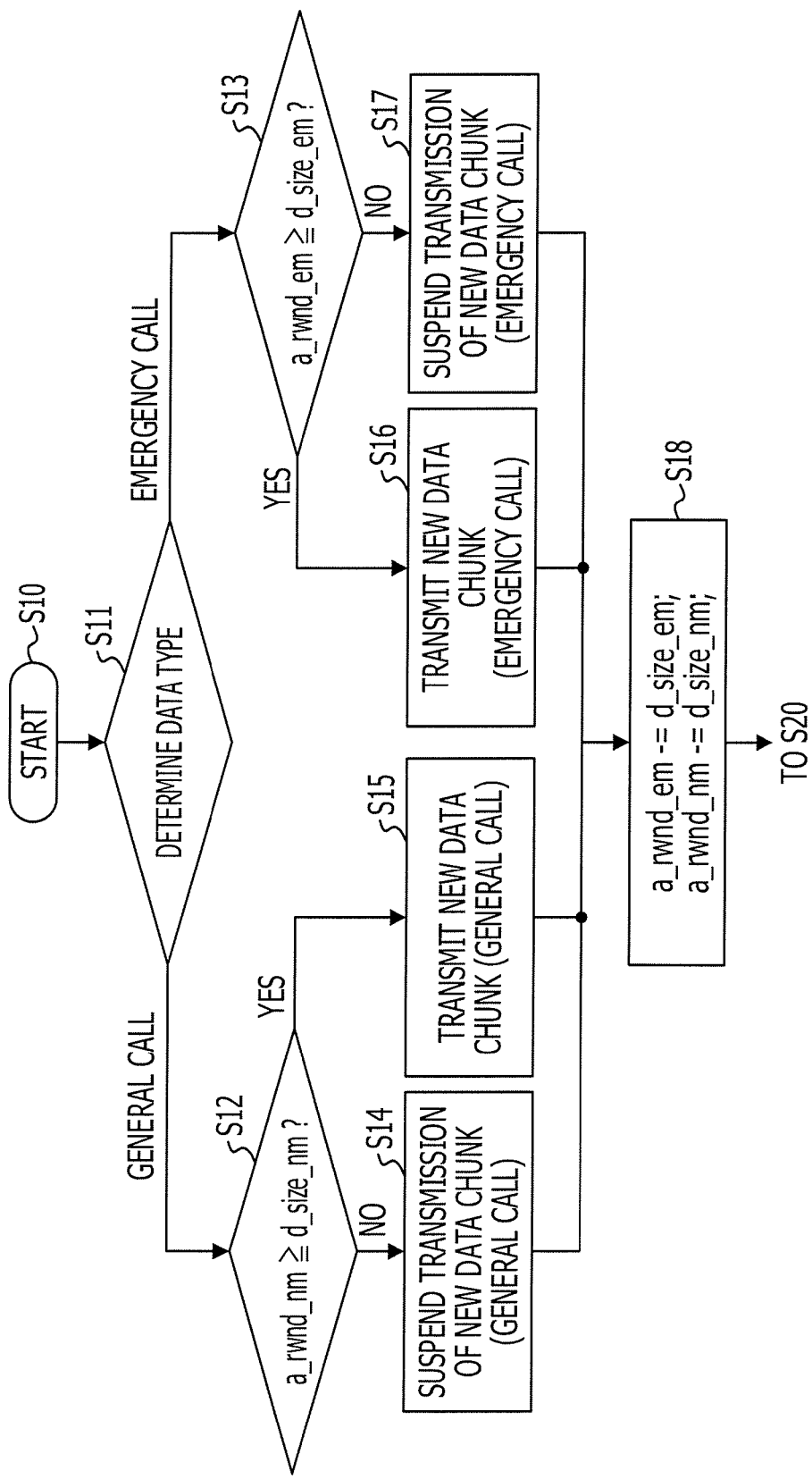
FIG. 11 depicts an example of a control method according to an embodiment.
Figure 12:
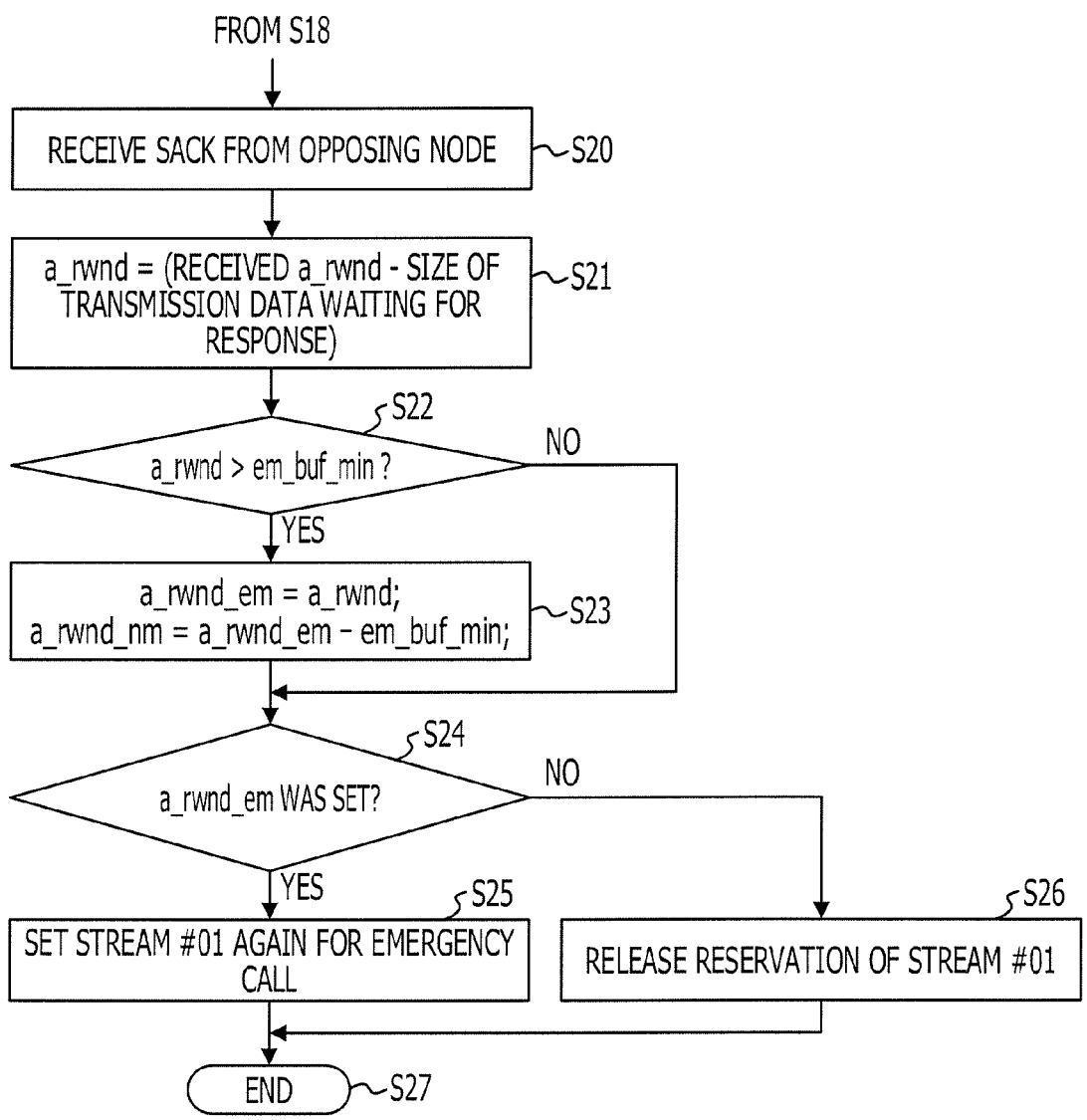
FIG. 12 depicts an example of a control method according to an embodiment.

Next, data transmission control to be performed in the SCTP association established as described above will be described with reference to FIG. 11 and FIG. 12.

When a transmission opportunity of SCTP data such as a call connection request occurs, the data transmission control starts (S10) and the data type determination unit 313 determines whether the transmission data is data with a relatively low priority (for example, data related to a general call) or data with a relatively high priority (for example, data related to an emergency call) (S11). Determination of a data type is performed based on, for example, information related to the data type specified by the application layer of the eNB 3.

When the transmission data is determined to be data related to a general call ("GENERAL CALL" in S11), the buffer management unit 312 compares the size (a_rwnd_nm) of a buffer for low priority communication (for a general call) with the size (d_size_nm) of this data and determines whether a_rwnd_nm is equal to or more than d_size_nm (S12).

When the buffer management unit 312 determines that a_rwnd_nm is equal to or more than d_size_nm (Yes in S12), the buffer management unit 312 transmits the new data chunk related to a general call to the opposing node 4 or 5 because the size of the reception buffer in the opposing node 4 or 5 is sufficient for buffering the low priority data such as a general call (S15).

On the other hand, when the buffer management unit 312 determines that a_rwnd_nm is less than d_size_nm (No in S12), the buffer management unit 312 transmits (queues) the new data chunk related to a general call to a transmission queue for a general call and suspends the transmission because the size of the reception buffer in the opposing node 4 or 5 is insufficient for buffering the low priority data such as a general call (S14).

When the transmission data is determined to be data related to an emergency call ("EMERGENCY CALL" in S11), the buffer management unit 312 compares the size (a_rwnd_em) of a buffer for high priority communication (for an emergency call) with the size (d_size_em) of this data and determines whether a_rwnd_em is equal to or more than d_size_em (S13).

When the buffer management unit 312 determines that a_rwnd_em is equal to or more than d_size_em (Yes in S13), the buffer management unit 312 transmits the new data chunk related to an emergency call to the opposing node 4 or 5 because the size of the reception buffer in the opposing node 4 or 5 is sufficient for buffering the high priority data such as an emergency call (S16). At this time, it is desirable for the new data chunk related to an emergency call and the new data chunk related to a general call not to be joined with each other.

On the other hand, when the buffer management unit 312 determines that a_rwnd_em is less than d_size_em (No in S13), the buffer management unit 312 transmits (queues) the new data chunk related to an emergency call to a transmission queue for an emergency call and suspends the transmission because the size of the reception buffer in the opposing node 4 or 5 is insufficient for buffering the high priority data such as an emergency call (S17). The eNB 3 has the transmission queue for a general call separately from the transmission queue for an emergency call in the above example, but one transmission queue may be used for a general call and emergency call. However, it is desirable to have the transmission queue for a general call separately from the transmission queue for an emergency call because of a delay caused by the suspended transmission in the eNB 3.

That is, the buffer management unit 312 performs control for transmitting data (for example, an emergency call) with the first priority on the basis of a size (a_rwnd=a_rwnd_em) of the free space of the reception buffer in the opposing node (reception side) 4 or 5. The buffer management unit 312 also performs control for transmitting data (for example, a general call) with the second priority, which is less than the first priority, on the basis of the a threshold (a_rwnd_nm) less than the size of the free space of the reception buffer in the opposing node (reception side) 4 or 5.

Following the processing in S14 to S17, the window size calculation unit 314 updates the size (a_rwnd_em) of a buffer for high priority communication (for an emergency call) and the size (a_rwnd_nm) of a buffer for low priority communication (for a general call). More specifically, for example, the window size calculation unit 314 sets, as a new size (a_rwnd_em) of a buffer for high priority communication (for an emergency call), a value obtained by subtracting the size (d_size_em) of transmission data related to an emergency call from the current a_rwnd_em value. The window size calculation unit 314 also sets, as a new size (a_rwnd_nm) of a buffer for low priority communication (for a general call), a value obtained by subtracting the size (d_size_nm) of transmission data related to a general call from the current a_rwnd_nm value (S18).

When the eNB 3 receives SACK from the opposing node 4 or 5 (S20), the window size calculation unit 314 updates the a_rwnd value. More specifically, for example, the window size calculation unit 314 sets, as a new a_rwnd value, a value obtained by subtracting the size of transmission data waiting for a response from the a_rwnd value included in the received SACK (S21).

The buffer management unit 312 compares em_buf_min set in S2 with the new a_rwnd value set in S21 and determines whether a_rwnd is more than em_buf_min (S22).

When the buffer management unit 312 determines that the new a_rwnd set in S21 is equal to or less than em_buf_min (No in S22), the buffer management unit 312 determines that the size of the reception buffer in the opposing node 4 or 5 becomes insufficient for buffering the high priority data such as an emergency call.

On the other hand, when the buffer management unit 312 determines that the new a_rwnd value set in S21 is more than em_buf_min (Yes in S22), the buffer management unit 312 determines that the size of the reception buffer in the opposing node 4 or 5 is sufficient for buffering the high priority data such as an emergency call.

In this case, the buffer management unit 312 updates the size (a_rwnd_em) of a buffer for high priority communication (for an emergency call) with the new a_rwnd value set in S21 and updates the size (a_rwnd_nm) of a buffer for low priority communication (for a general call) with a value obtained by subtracting em_buf_min from the a_rwnd_em value (S23).

Next, the buffer management unit 312 determines whether the size (a_rwnd_em) of a buffer for high priority communication (for an emergency call) was set (updated) (S24).

When the buffer management unit 312 determines that the size (a_rwnd_em) of a buffer for high priority communication (for an emergency call) was not set, that is, the processing proceeded to No in S22 (No in S24), the eNB 3 releases the reserved one (for example, stream #01) of the streams in the SCTP association that were set for communication for an emergency call (S26) and ends the processing (S27). As a result, one (for example, stream #01) of the streams in the SCTP association that were set for communication for an emergency call may be used for communication for a general call.

On the other hand, when the buffer management unit 312 determines that the size (a_rwnd_em) of a buffer for high priority communication (for an emergency call) was set, that is, the processing proceeded to Yes in S22 (Yes in step S24), the eNB 3 sets one (for example, stream #01) of the streams in the SCTP association again for communication for an emergency call (S25) and ends the processing (S27).

As described above, in this example, communication control that depends on the priority is enabled in communication using SCTP. More specifically, for example, the buffer full state caused by a general call may be avoided by suppression of the frequency of data transmission for a general call. In addition, the processing delay of an emergency call is suppressed by giving a higher priority to data transmission processing of an emergency call than to data transmission processing of a general call.

Dynamic Control of a_rwnd_nm and em_buf_min

As illustrated in FIG. 10, the values of a_rwnd_em, a_rwnd_nm, and em_buf_min are set during establishment of an SCTP association in this example. When, for example, an emergency call occurs frequently, a reserved buffer of the minimum guaranteed buffer size (em_buf_min) for high priority communication (for an emergency call) may be immediately used up.

On the other hand, if a large part of the reception buffer in the opposing node 4 or 5 is assigned as a buffer of the minimum guaranteed buffer size (em_buf_min) for high priority communication (for an emergency call), the size (a_rwnd_nm) of a buffer for low priority communication (for a general call) becomes insufficient.

Accordingly, for example, the number of occurrences of high priority signaling such as an emergency call and the number of occurrences of low priority signaling such as a general call are measured for a certain period and, based on the result of the measurement, the size (a_rwnd_nm) of a buffer for low priority communication (for a general call) may be increased or decreased dynamically.

More specifically, for example, the buffer management unit 312 measures the number of occurrences of a general call and the number of occurrences of an emergency call at regular time intervals. Then, the buffer management unit 312 dynamically sets the values of a_rwnd_em, a_rwnd_nm, and em_buf_min so that the ratio between a_rwnd_nm and em_buf_min equals the ratio between the number of occurrences of a general call and the number of occurrences of an emergency call.

However, when a_rwnd_nm calculated as described above satisfies the expression "a_rwnd–a_rwnd_nm<(the first set value of the em_buf_min)", it is desirable that the first set value of em_buf_min is reserved by setting a_rwnd_nm so that the expression "a_rwnd_nm=a_rwnd_em–(the first set value of the em_buf_min)" is satisfied.

An example of the above dynamic control will be described in FIG. 13.

Figure 13:
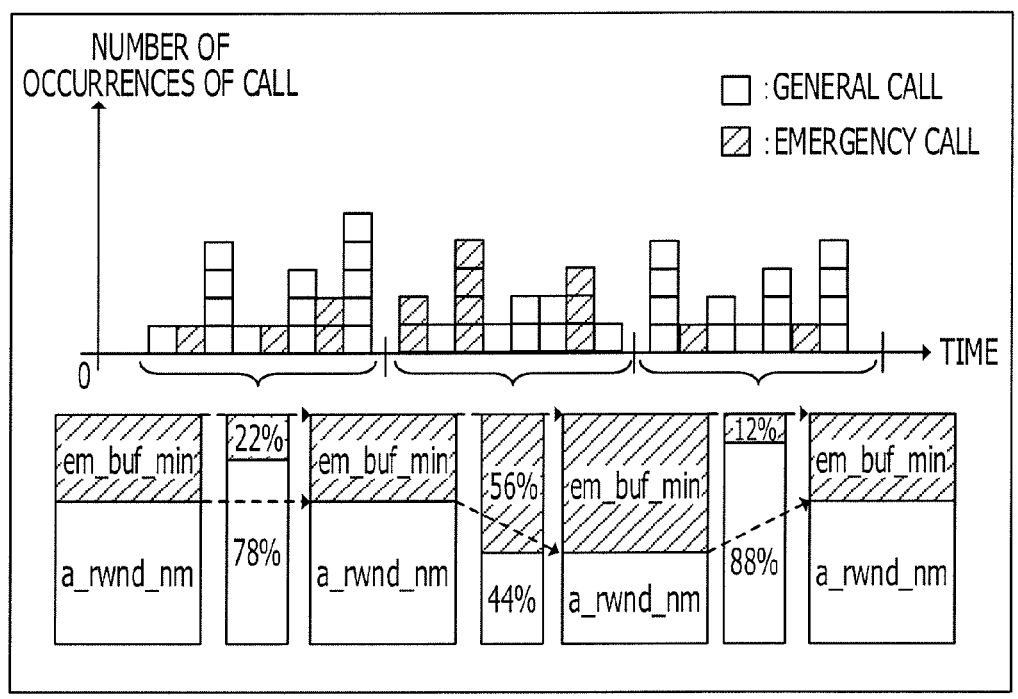
FIG. 13 depicts an example of dynamic control of a high priority buffer capacity.

As illustrated in FIG. 13, this example is able to manage the buffer dynamically depending on the number of occurrences of a general call and the number of occurrences of an emergency call while keeping the em_buf_min value that was set first, thereby enabling more flexible communication control.

Another Example of Transmission Control Operation of eNB 3

Figure 14:
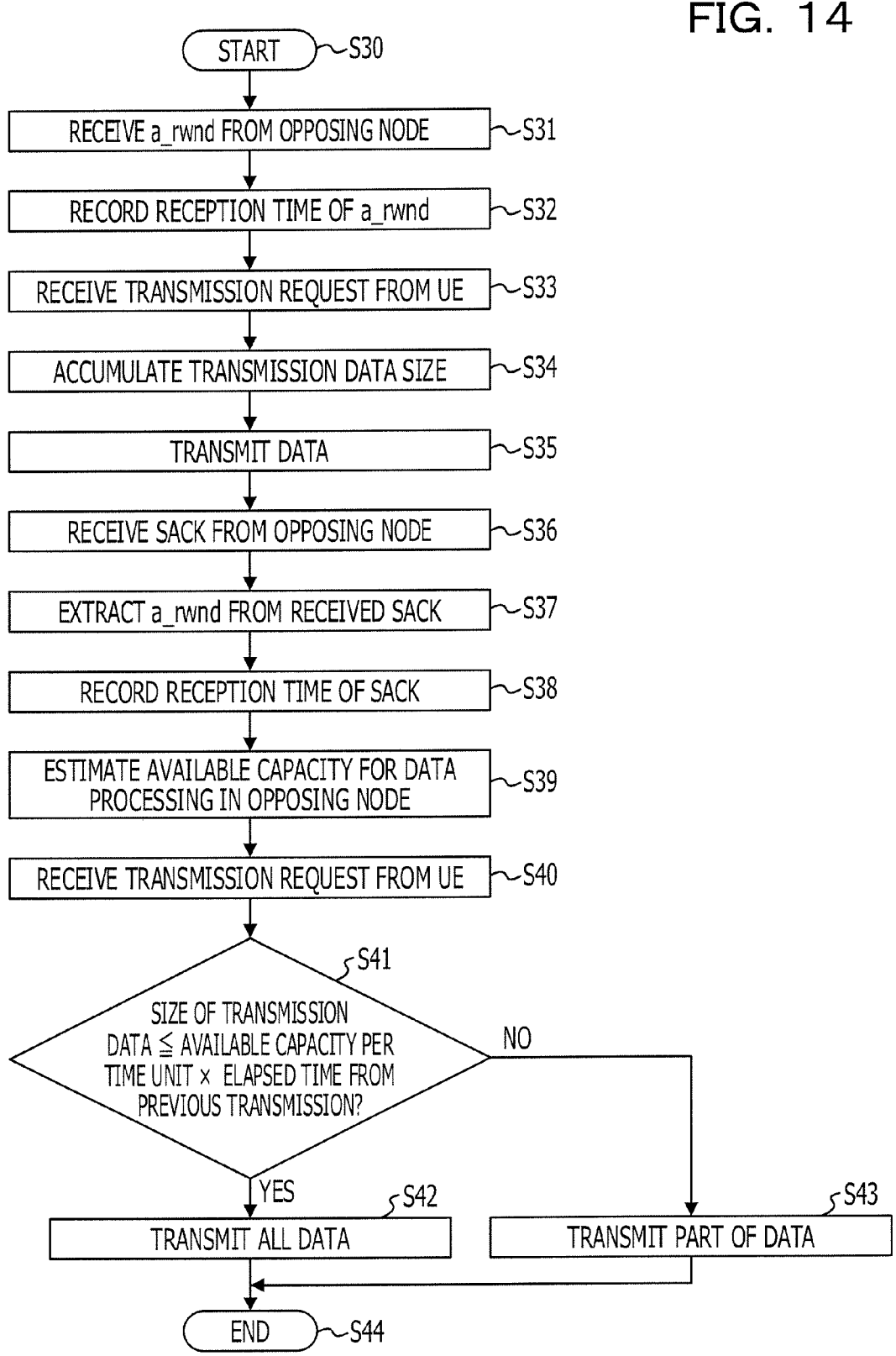
FIG. 14 depicts an example of a control method according to an embodiment.

Next, estimation of the available capacity for data processing in the opposing node 4 or 5 will be described as an example of another example of transmission control operation of the eNB 3 with reference to FIG. 14.

When processing is started on, for example, a start of establishment of an SCTP association (S30), the eNB 3 obtains the a_rwnd value included in an INIT-ACK chunk transmitted from the opposing node 4 or 5 (S31).

In addition, the processing power estimation unit 315 of the eNB 3 records the reception time of the a_rwnd value (S32).

When the eNB 3 receives a data transmission request from the UE 2 (S33), the processing power estimation unit 315 of the eNB 3 records accumulated value of the transmission data size (S34).

Then, according to the transmission request from the UE 2, the eNB 3 transmits data to the opposing node 4 or 5 (S35), receives SACK from the opposing node 4 or 5 (S36), and extracts the a_rwnd value included in the received SACK (S37). The extracted a_rwnd value is reported to the processing power estimation unit 315.

In addition, the processing power estimation unit 315 of the eNB 3 records the reception time of the above SACK (S38).

Then, the processing power estimation unit 315 estimates available capacity for data processing in the opposing node 4 or 5 (S39). More specifically, for example, the processing power estimation unit 315 estimates the available capacity for data processing in the opposing node 4 or 5 on the basis of the amount of transmission data, the data transmission interval, and the a_rwnd value reported from the opposing node 4 or 5.

As an example, the processing power estimation unit 315 may estimate the available capacity for data processing in the opposing node 4 or 5 on the basis of the following expression (1).

$$X=(A+B)/T \quad (1)$$

In the above expression (1), X represents the available capacity for data processing per unit time in the opposing node 4 or 5, A represents the total amount of transmission data between the reception time of the previous a_rwnd and the reception time of the current a_rwnd, B represents the difference between the previous a_rwnd and the current a_rwnd, and T represents the difference between the reception time of the previous a_rwnd and the reception time of the current a_rwnd. The result of this estimation is reported from the processing power estimation unit 315 to the buffer management unit 312.

When the eNB 3 receives a new data transmission request from the UE 2 (S40), the buffer management unit 312 determines whether the size of transmission data is equal to or less than a product (result of multiplication) of the available capacity for data processing per time unit in the opposing node 4 or 5 estimated in S39 and the elapsed time from the previous data transmission (S41).

When the buffer management unit 312 determines that the size of transmission data is equal to or less than the product of the available capacity for data processing per time unit in the opposing node 4 or 5 estimated in S39 and the elapsed time from the previous data transmission (Yes in S41), the buffer management unit 312 transmits all the data specified by the transmission request from the UE 2 (S42) and ends the processing (S44).

On the other hand, when the buffer management unit 312 determines that the size of transmission data is more than the product of the available capacity for data processing per time unit in the opposing node 4 or 5 estimated in S39 and the elapsed time from the previous data transmission (No in S41), the buffer management unit 312 transmits, to the opposing node 4 or 5, a part of data of the size equivalent to the product of the available capacity for data processing per time unit in the opposing node 4 or 5 estimated in S39 and the elapsed time from the previous data transmission (S43) and ends the processing (S44) without transmitting the remaining data. The data that was not transmitted may be transmitted at the next transmission timing.

That is, the buffer management unit 312 performs data transmission control on the basis of the available capacity for data processing in the opposing node (reception side) 4 or 5 estimated based on the size of the free space of the reception buffer in the opposing node (reception side) 4 or 5 and a size of data which has been transmitted to the opposing node (reception side) 4 or 5.

Figure 15:
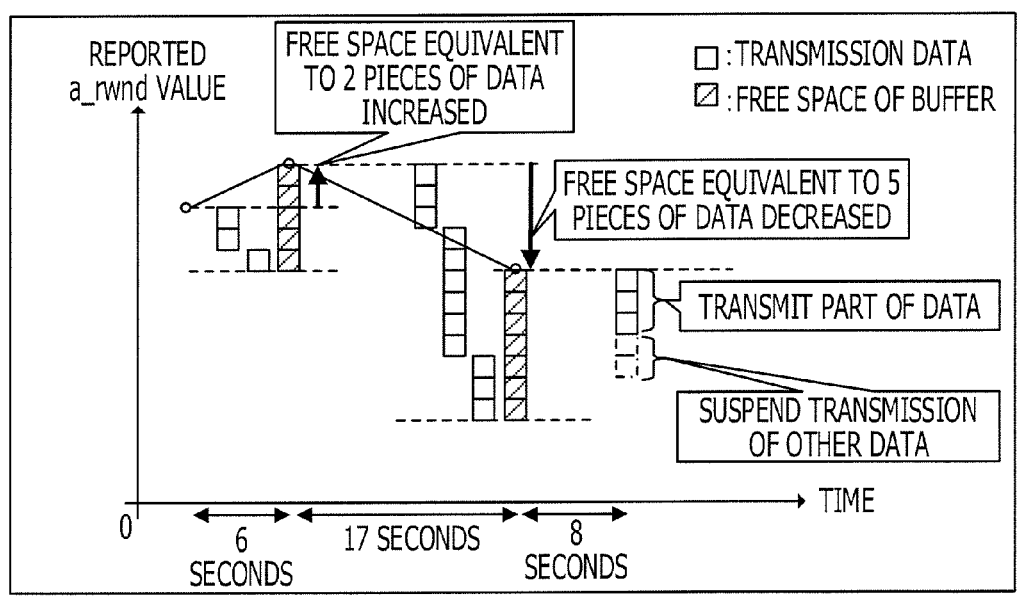
FIG. 15 depicts an example of a control method according to an embodiment.

An example of the above transmission control is depicted in FIG. 15.

When three pieces of data were transmitted for six seconds and the reported a_rwnd value indicates that the free space equivalent to two pieces of data increased in the reception buffer in the opposing node 4 or 5 as illustrated in FIG. 15, the processing power estimation unit 315 estimates that the opposing node 4 or 5 is able to process five pieces of data for six seconds. That is, the processing power estimation unit 315 estimates the available capacity for data processing per time unit in the opposing node 4 or 5 to be approximately 0.83 (=5/6) (pieces/second).

When 12 pieces of data have to be transmitted for the next 17 seconds, the eNB 3 is able to transmit all of the 12 pieces of data to the opposing node 4 or 5, since the previously estimated available capacity for data processing per time unit in the opposing node 4 or 5 multiplied by 17 seconds equals approximately 14.17 pieces of data.

If the reported a_rwnd indicates that the free space equivalent to five pieces of data decreased in the reception buffer in the opposing node 4 or 5 as a result of this transmission, the processing power estimation unit 315 estimates that the opposing node 4 or 5 is able to process seven (=12−5) pieces of data for 17 seconds. That is, the processing power estimation unit 315 estimates the available capacity for data processing per time unit in the opposing node 4 or 5 to be approximately 0.41 (=7/17) pieces/second.

When five pieces of data have to be transmitted for the next eight seconds, the eNB 3 transmits three of five pieces of data to the opposing node 4 or 5 and suspends the transmission of two pieces of data, since the previously estimated available capacity for data processing per time unit in the opposing node 4 or 5 multiplied by eight seconds equals approximately 3.29 pieces of data.

Since this example controls the amount of transmission data on the basis of the result of estimation of the processing power of the opposing node 4 or 5, occurrence of a processing delay in the opposing node 4 or 5 is suppressed. As a result, an emergency call may be processed immediately.

Example of Hardware Configuration

Figure 16:
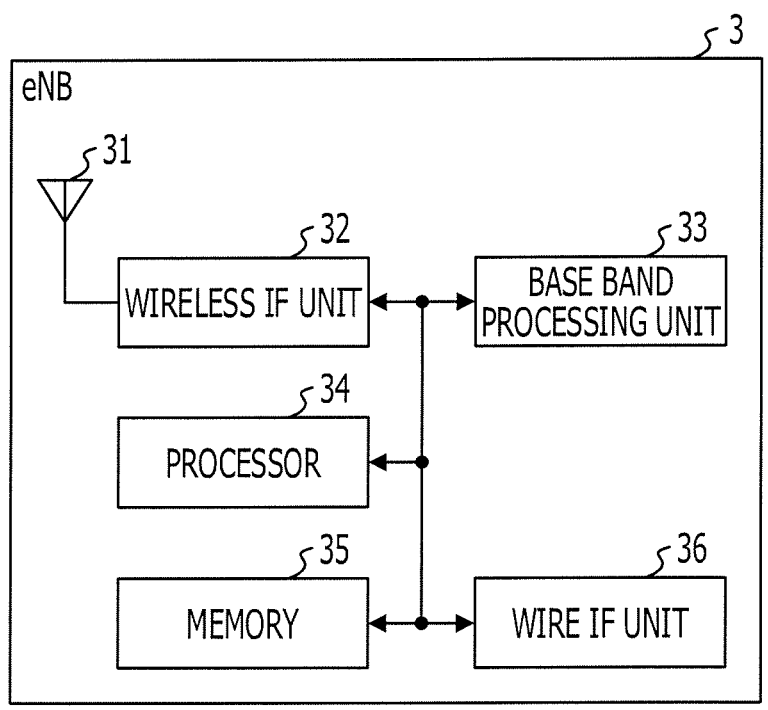
FIG. 16 depicts an example of a hardware configuration of eNB.

FIG. 16 depicts an example of a hardware configuration of the eNB 3.

As depicted in FIG. 16, the eNB 3 includes, for example, an antenna 31, a wireless IF unit 32, a base band processing unit 33, a processor 34, a memory 35, and a wire IF unit 36.

The wireless IF unit 32 is, for example, an interface device that wirelessly communicates with the UE 2 via the antenna 31. The base band processing unit 33 is a circuit that applies a certain base band processing to a radio signal received by the antenna 31 and the wireless IF unit 32 and applies a certain base band processing to a signal to be transmitted via the antenna 31 and the wireless IF unit 32. The base band processing unit 33 includes, for example, an LSI (large scale integration), an FPGA (field programmable gate array), and the like. The processor 34 is a device that processes data. The processor 34 includes, for example, a CPU (central processing unit), a DSP (digital signal processor), and the like. The memory 35 is a device that stores data. The memory 35 includes, for example, a ROM (read-only memory), a RAM (random access memory), and the like. The wire IF unit 36 is an interface device that performs wire communication with a network (a so-called backhaul network) on the core network 6 side of the communication system 1.

The correspondence between components of the eNB 3 illustrated in FIG. 8 and components of the eNB 3 illustrated in FIG. 16 will be described below, for example.

The antenna 31 corresponds to, for example, the antenna 301. The wireless IF unit 32 corresponds to, for example, the RF unit 302, the DAC 303, and the ADC 304.

The base band processing unit 33 corresponds to, for example, the BB unit 305, the transmission unit 306, and the reception unit 307. The processor 34 and the memory 35 correspond to, for example, the radio communication control unit 308, the radio area control unit 309, the call processing control unit 310, the network communication control unit 311, the buffer management unit 312, the data type determination unit 313, the window size calculation unit 314, and the processing power estimation unit 315.

In addition, the wire IF unit 36 corresponds to, for example, the wire IF unit 316.

That is, the antenna 31 functions as an example of a reception unit that receives information about the size of the free space of the reception buffer on the reception side. The processor 34 functions as an example of a processor that performs control for transmitting data with the first priority based on the size of the free space of the reception buffer on the reception side and performs control for transmitting data with the second priority, which is lower than the first priority, based on a threshold less than the size of the free space of the reception buffer.

The processor 34 also functions as an example of a processor that performs data transmission control based on the available capacity for data processing on the reception side, which is estimated based on the size of the free space of the reception buffer on the reception side and the size of data which has been transmitted to the reception side.

Figure 17:
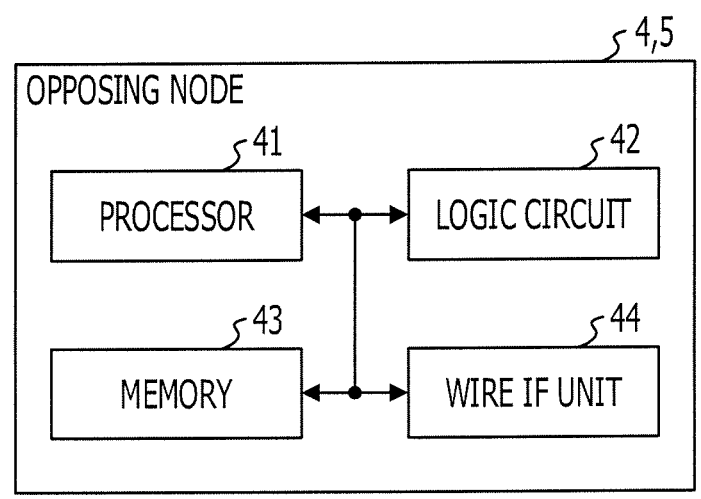
FIG. 17 depicts an example of a hardware configuration of opposing nodes.

FIG. 17 depicts an example of a hardware configuration of the opposing node 4 or 5.

As depicted in FIG. 17, the opposing node 4 or 5 includes, for example, a processor 41, a logic circuit 42, a memory 43, and a wire IF unit 44.

The processor 41 is a device that processes data. The processor 41 includes, for example, a CPU, a DSP, and the like. The logic circuit 42 is an electronic circuit that performs logical operation. The logic circuit 42 includes, for example, an LSI, an FPGA, and the like. The memory 43 is a device that stores data. The memory 43 includes, for example, a ROM, a RAM, and the like. The wire IF unit 44 is an interface device that performs wire communication with the eNB 3.

That is, the memory 43 functions as an example of the reception buffer and the wire IF unit 44 functions as an example of a transmission unit that reports the size of the free space of the reception buffer in the opposing node 4 or 5 to the eNB (transmission device) 3.

Others

The components and functions of the eNB 3 and the opposing node 4 or 5 in the above embodiment may be selected or may be combined as appropriate. That is, the above components and functions may be selected or combined as appropriate to achieve the functions of the embodiment.

In addition, a general call is adopted as an example of data with a relatively low priority and an emergency call is adopted as an example of data with a relatively high priority in the example described above, but these priorities may be changed by, for example, the user, system administrator, or the like. Accordingly, it will be appreciated that the embodiment is not limited to the above example.

In addition, the embodiment has been described using an example in which the communication control in this example is applied between the eNB 3 and the opposing node 4 or 5 in the above example, but the embodiment may be applied between other devices that communicate with each other using SCTP. Accordingly, it will be appreciated that the embodiment is not limited to the above example.

A computer (including a CPU, information processing apparatus, and various types of terminal equipment) may achieve the above functions operating as the eNB 3 by executing a program.

That is, the above program is an exemplary program that causes a computer incorporated in a communication apparatus that communicates via a communication link established using SCTP to perform control for transmitting data with the first priority on the basis of the size of the free space of the reception buffer on the reception side and to perform control for transmitting data with the second priority, which is lower than the first priority, on the basis of a threshold less than the size of the free space of the reception buffer.

In addition, the above program is an exemplary program that causes a computer incorporated in a communication apparatus that communicates via a communication link established using SCTP to estimate the available capacity for data processing on the reception side on the basis of the size of the free space of the reception buffer on the reception side and the size of data which has been transmitted to the reception side and to perform data transmission control on the basis of the result of the estimation.

The above program may be stored in and provided, for example, in the form of a computer-readable recording medium such as a flexible disk, CD (compact disc) including CD-ROM, CD-R (CD recordable), CD-RW (CD-ReWritable), and the like, DVD (digital versatile disk) including DVD-ROM, DVD-RAM, DVD-R, DVD-RW, DVD+R (DVD plus R), DVD+RW (DVD plus RW), and the like, etc. In this case, the computer uses the above program by reading it from such a recording medium and transferring it to and storing it in an internal storage device or external storage device. The program may be recorded in a storage device (recording medium) such as, for example, a magnetic disk, optical disk, or magnetic optical disk so that the program in the storage device is provided for the computer via a communication line. As the recording medium, in addition to the above flexible disk, CD, DVD, magnetic disk, optical disk, and magnetic optical disk, it is possible to use computer-readable media such as an IC (integrated circuit) card, ROM cartridge, magnetic tape, punch card, internal storage device (memory such as a RAM or ROM) or external storage device etc. of a computer, or printed matter or the like on which a code such as a barcode is printed.

In addition, a computer represents a concept including hardware and OS (operating system) on which the hardware operates. In such a case where only a program drives hardware without using an OS, the hardware corresponds to a computer. Hardware includes at least a processor such as a CPU and a reader that reads a computer program recorded in a recording medium.

The above program further includes a program code that causes a computer as described above to achieve the function operating as eNB 3. An OS may cause a computer to achieve a part of the function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for controlling a communication system including a transmission device and a reception device, the method comprising:
   reporting, by the reception device, a first size of a free space of a buffer in the reception device to the transmission device;
   upon determining that the first size is greater than a first threshold selected for first data with a first priority and that a second size of the first data is equal to or less than the first size, controlling, by the transmission device, transmission of the first data with the first priority to the reception device; and
   controlling, by the transmission device, transmission of second data with a second priority lower than the first priority to the reception device based on a second threshold less than the first size.

2. The method according to claim 1, wherein the controlling transmission of the first data includes:
   suspending transmission of the first data when the second size is more than the first size.

3. The method according to claim 1, wherein the controlling transmission of the second data includes:
   transmitting the second data to the reception device when a third size of the second data is equal to or less than the second threshold, and
   suspending transmission of the second data when the third size is more than the second threshold.

4. The method according to claim 1, further comprising:
   changing dynamically, by the transmission device, the second threshold depending on a first number of occurrences of the first data and a second number of occurrences of the second data.

5. The method according to claim 4, further comprising:
controlling, by the transmission device, the second threshold so that a difference between the first size and the changed threshold becomes equal to or more than a certain value.

6. The method according to claim 1, wherein the transmission device and the reception device communicate with each other via a communication link established using Stream Control Transmission Protocol.

7. A method for controlling a communication system including a transmission device and a reception device, the method comprising:
transmitting, by the reception device, a report comprising a size of a free space of a buffer in the reception device to the transmission device;
receiving the report by the transmission device;
estimating, by the transmission device, available capacity for data processing in the reception device based on the report and a size of first data which has been transmitted to the reception device; and
controlling, by the transmission device, transmission of second data to the reception device based on the estimated available capacity.

8. A communication apparatus to communicate with a reception device, the communication apparatus comprising:
a reception unit to receive information about a first size of a free space of a buffer on the reception device; and
a processor to
upon determining that the first size is greater than a first threshold selected for first data with a first priority and a second size of the first data is equal to or less than the first size, control transmission of the first data with the first priority to the reception device, and
control transmission of second data with a second priority lower than the first priority to the reception device based on a second threshold less than the first size.

9. A communication apparatus to communicate with a reception device, the communication apparatus comprising:
a reception unit to receive a report comprising information about a size of a free space of a buffer on the reception device; and
a processor to
estimate available capacity for data processing in the reception device based on the report and a size of first data which has been transmitted to the reception device, and
control transmission of second data to the reception device based on the estimated available capacity.

* * * * *